United States Patent
Chang

(10) Patent No.: US 8,632,197 B2
(45) Date of Patent: Jan. 21, 2014

(54) ILLUMINATION SYSTEM AND WAVELENGTH-TRANSFORMING DEVICE THEREOF

(71) Applicant: Delta Electronics, Inc., Taoyuan Hsien (TW)

(72) Inventor: Keh-Su Chang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 13/724,401

(22) Filed: Dec. 21, 2012

(65) Prior Publication Data

US 2013/0163224 A1 Jun. 27, 2013

Related U.S. Application Data

(60) Provisional application No. 61/580,380, filed on Dec. 27, 2011.

(51) Int. Cl.
*F21V 9/16* (2006.01)
*F21V 13/02* (2006.01)

(52) U.S. Cl.
USPC ............. 362/84; 362/282; 362/293; 362/227; 362/311.02

(58) Field of Classification Search
USPC ................. 362/84, 259, 251, 217.2, 351, 293
See application file for complete search history.

(56) References Cited

U.S. PATENT DOCUMENTS

| | | | |
|---|---|---|---|
| 7,461,950 B2 * | 12/2008 | Yamanaka | 362/293 |
| 2012/0201030 A1 * | 8/2012 | Yuan et al. | 362/293 |
| 2013/0063704 A1 * | 3/2013 | Hu et al. | 353/31 |
| 2013/0077055 A1 * | 3/2013 | Wang et al. | 353/31 |
| 2013/0162955 A1 * | 6/2013 | Okamoto et al. | 353/30 |

* cited by examiner

*Primary Examiner* — Tracie Y Green
(74) *Attorney, Agent, or Firm* — Kirton McConkie; Evan R. Witt

(57) ABSTRACT

An illumination system includes a wavelength-transforming device, a solid-state light-emitting element and a filter wheel. The wavelength-transforming device comprises a segment and a wavelength-transforming element disposed on the segment. The solid-state light-emitting element emits first color light in first waveband region to the wavelength-transforming device. The filter wheel is disposed on one side of the wavelength-transforming device for filtering lights via rotating. The first color light is excited as second color light in second waveband region by the wavelength-transforming device, so that the second color light is outputted with the rest of the first color light. The first and second color lights are transmitted through the filter wheel, such that three primary color lights are sequentially projected. The present invention achieves the advantages of reducing cost, simplifying fabricating processes, being available for high working temperature, and further improving image quality without using red phosphor agent or red solid-state light-emitting element.

12 Claims, 7 Drawing Sheets

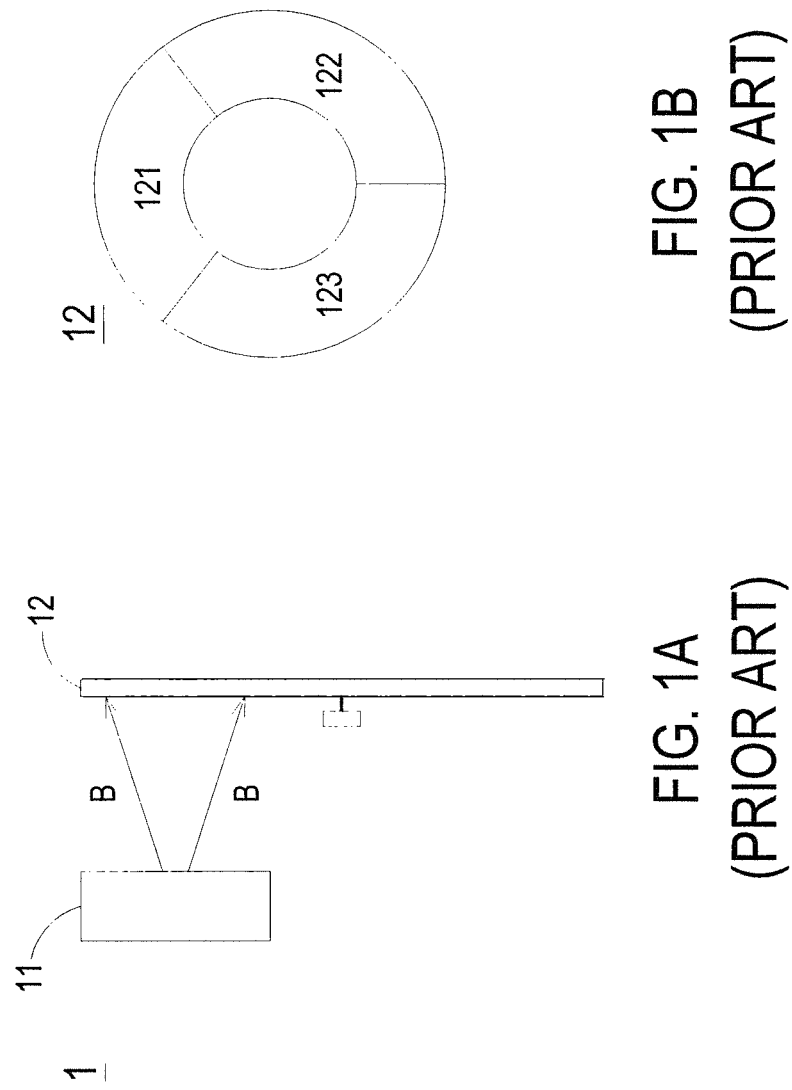

ILLUMINATION SYSTEM AND WAVELENGTH-TRANSFORMING DEVICE THEREOF

CROSS-REFERENCE TO RELATED APPLICATION

This application claims the benefit of U.S. Provisional Application No. 61/580,380 filed on Dec. 27, 2011, and entitled "SOLID STATE REMOTE WHITE LIGHT SOURCE FOR PROJECTION", the entirety of which is hereby incorporated by reference.

FIELD OF THE INVENTION

The present invention relates to a system, and more particularly to an illumination system and a wavelength-transforming device thereof.

BACKGROUND OF THE INVENTION

In recent years, kinds of projectors are widely used in schools, homes and business occasions in order to amplify image signals provided by an image signal source and then display on a projection screen. For the purpose of reducing the power consumption and the size of devices, a solid-state light-emitting element is employed in the illumination system of current projector to replace the conventional high intensity discharge (HID) lamp.

Generally, the illumination system of the projector should emit three primary color lights, i.e. red light (R), green light (G) and blue light (B). As for the luminous efficiency of the solid-state light-emitting element, the luminous efficiency of the blue solid-state light-emitting element is higher than the luminous efficiency of the red solid-state light-emitting element and the luminous efficiency of the green solid-state light-emitting element. Since the blue solid-state light-emitting element has better luminous efficiency, the red light and the green light are produced by using a blue solid-state light-emitting element and a wavelength-transforming device to excite blue light as red light or green light (e.g. a phosphor wheel or a phosphor plate). That is, in replace of the red solid-state light-emitting element and the green solid-state light-emitting element, the uses of the blue solid-state light-emitting element and the device containing phosphor coating may directly emit the red light or the green light. Consequently, the luminous efficiency of the whole illumination system is enhanced.

For example, a single blue solid-state light-emitting element and a single phosphor wheel having a plurality of segments are used in current illumination system. FIG. 1A schematically illustrates the configuration of a conventional illumination system. FIG. 1B schematically illustrates the configuration of the phosphor wheel having a plurality of segments used in the illumination system as shown in FIG. 1A. As shown in FIG. 1A and FIG. 1B, a blue solid-state light-emitting element 11 of a conventional illumination system 1 emits blue light B to a phosphor wheel 12 including a first segment 121, a second segment 122 and a third segment 123. The first segment 121 is coated with a green phosphor agent in order to excite the incident blue light B as exit green light. The second segment 122 is coated with a red phosphor agent in order to excite the incident blue light B as exit red light. The third segment 123 is a transparent segment such that the blue light B is transmitted through the third segment 123. In other words, the blue light B emitted by the blue solid-state light-emitting element 11 is transmitted through the phosphor wheel 12 directly or is excited or transformed as green light or red light by the phosphor wheel 12, so that the illumination system emits the three primary color lights.

However, the red phosphor agent still has some drawbacks. For example, the cost of the red phosphor agent is higher and the performance in high working temperature is worse. Moreover, the red phosphor agent has a heavier weight than the green phosphor agent, so that the phosphor wheel coated with the red phosphor agent and the green phosphor agent has to be fixed of rotating balance. To overcome these drawbacks, another conventional illumination system equipped with a blue solid-state light-emitting element and a red solid-state light-emitting element is developed and projecting with the characteristic of dichroic mirrors. FIG. 2A schematically illustrates the configuration of another conventional illumination system. FIG. 2B schematically illustrates the configuration of the phosphor wheel as shown in FIG. 2A. Blue light B is emitted to a phosphor wheel 22 including a first segment 221 and a second segment 222 by a blue solid-state light-emitting element 21 of a conventional illumination system 2. The first segment 221 is coated with a green phosphor agent in order to excite the incident blue light B as exit green light G. The second segment 222 is a transparent segment such that the blue light B is transmitted through the second segment 222 and outputted. On the other hand, the illumination system 2 is also equipped with a dichroic mirror 24, which reflects red light and allows green light and blue light to be transmitted. Red light R emitted by a red solid-state light-emitting element 23 is reflected to the optical path by the dichroic mirror 24, and the blue light B and the green light G are passed through the dichroic mirror 24 and transmitted to the optical path. As a result, the blue light B, the green light G and the red light R are projected.

In some conventional illumination systems, the projecting structure and mechanism mentioned above can be used to operate with a common projector. Nevertheless, not only the overall fabricating cost, but also the fabricating time and difficulty of the illumination system will be increased due to the higher price, the higher weight and the worse performance in high working temperature of the red phosphor agent, which is coated on a segment of the phosphor wheel of the illumination system.

At the same time, when a driving current of a blue light laser of the above-mentioned illumination system is larger, the luminance and the illuminance of the red light will decay because of the characteristic of the red phosphor agent. Therefore, the luminance and the illuminance will be too low, such that the whole brightness cannot be integrated effectively, and further the sharpness and the contrast of color will be affected.

There is a need of providing an improved illumination system and a wavelength-transforming device thereof to obviate the drawbacks encountered from the prior art.

SUMMARY OF THE INVENTION

The present invention provides an illumination system and a wavelength-transforming device thereof in order to eliminate the drawbacks caused by the higher price and weight and the worse performance in high working temperature of the red phosphor agent (e.g. high fabricating cost and difficulty, long fabricating time, low brightness and illuminance decay).

The present invention also provides an illumination system and a wavelength-transforming device thereof. The illumination system utilizes a single solid-state light-emitting element and a single wavelength-transforming device having a single segment in replace of conventional red phosphor agent or conventional red solid-state light-emitting element to simplify the fabricating processes, reduce the fabricating cost, be used in high working temperature, and further improve the color purity and image quality.

The present invention further provides an illumination system and a wavelength-transforming device thereof. Via the wavelength-transforming device, a first color light in a first waveband region is excited and transformed as a second color light in a wider waveband region, which is the second waveband region. As a result, the illumination system emits red light without using a red phosphor agent, so that the luminance and illuminance decay caused by the characteristic of the red phosphor agent when the driving current of the blue light laser rises is avoided.

In accordance with an aspect of the present invention, there is provided an illumination system. The illumination system includes a wavelength-transforming device, a solid-state light-emitting element and a filter wheel. The wavelength-transforming device comprises a segment and a wavelength-transforming element. The wavelength-transforming element is disposed on the segment. A first color light in a first waveband region is emitted to the wavelength-transforming device by the solid-state light-emitting element. The filter wheel is disposed on one side of the wavelength-transforming device for filtering lights through rotating. The first color light in the first waveband region is excited as a second color light in a second waveband region by the wavelength-transforming device. The second color light is outputted with the rest of the first color light. The first color light and the second color light are transmitted through the filter wheel, such that three primary color lights are sequentially projected.

In accordance with another aspect of the present invention, there is provided a wavelength-transforming device of an illumination system emitting a first color light in a first waveband region and comprising a filter wheel. The wavelength-transforming device includes a segment and a wavelength-transforming element. The wavelength-transforming element is disposed on the segment. The first color light in the first waveband region is received and excited as a second color light in a second waveband region by the wavelength-transforming element. The second color light is outputted with the rest of the first color light. The first color light and the second color light are transmitted through the filter wheel, such that three primary color lights are sequentially projected.

The above contents of the present invention will become more readily apparent to those ordinarily skilled in the art after reviewing the following detailed description and accompanying drawings, in which:

BRIEF DESCRIPTION OF THE DRAWINGS

FIG. 1A schematically illustrates the configuration of a conventional illumination system;

FIG. 1B schematically illustrates the configuration of the phosphor wheel having a plurality of segments used in the illumination system as shown in FIG. 1A;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figures 2A, 2B:
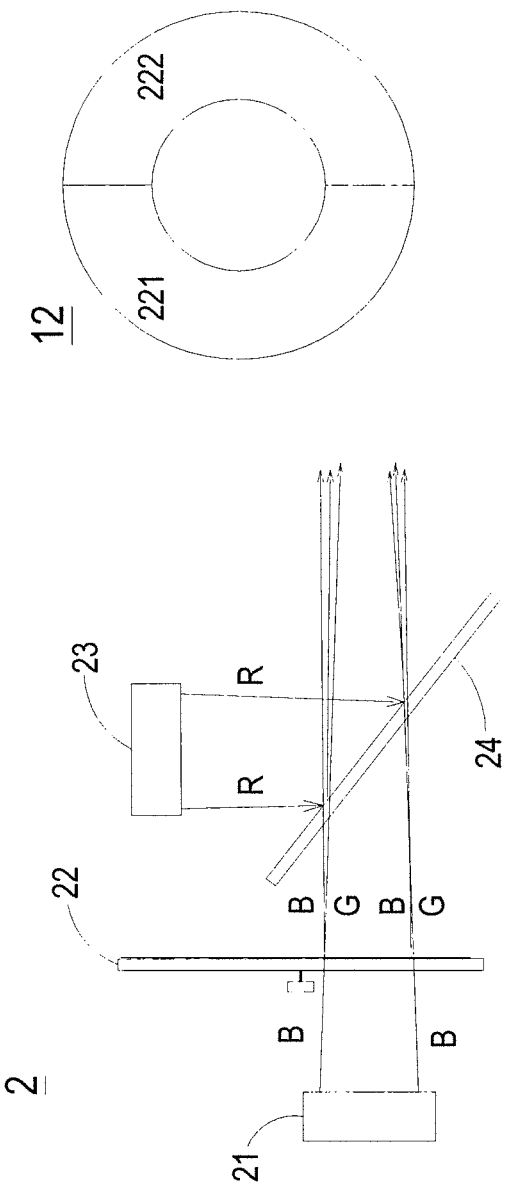
FIG. 2A schematically illustrates the configuration of another conventional illumination system.
FIG. 2B schematically illustrates the configuration of the phosphor wheel as shown in FIG. 2A.
Figure 3A:
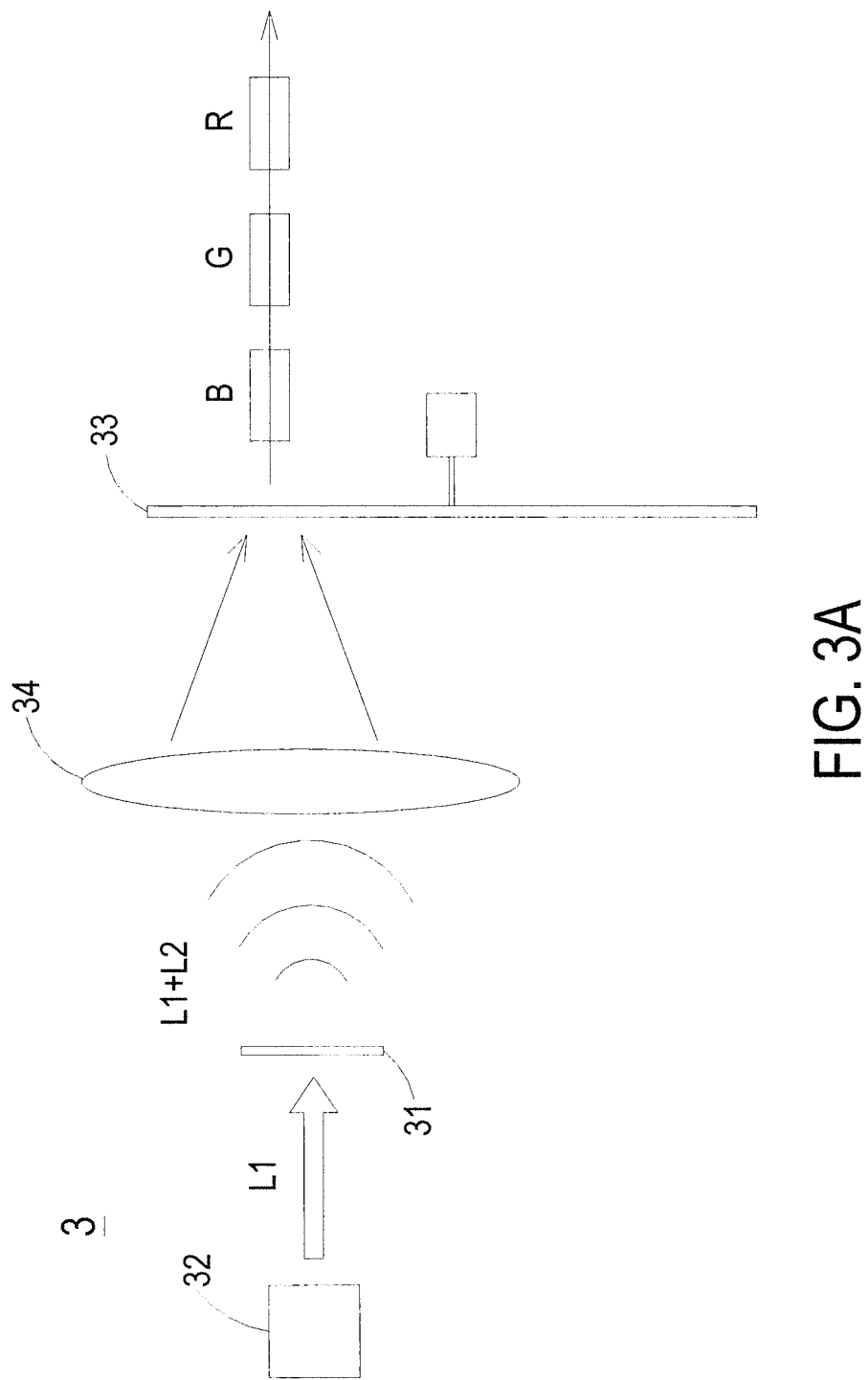
FIG. 3A schematically illustrates the configuration of an illumination system according to an embodiment of the present invention.
Figure 3C:
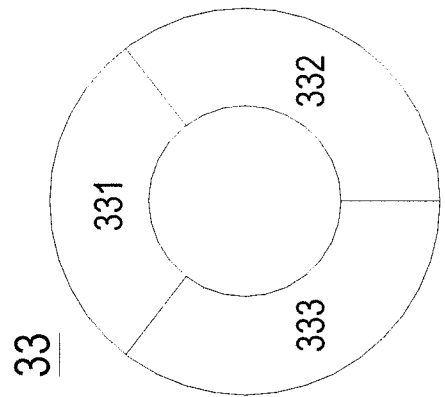
FIG. 3C schematically illustrates the configuration of a filter wheel as shown in FIG. 3A.
Figure 3B:
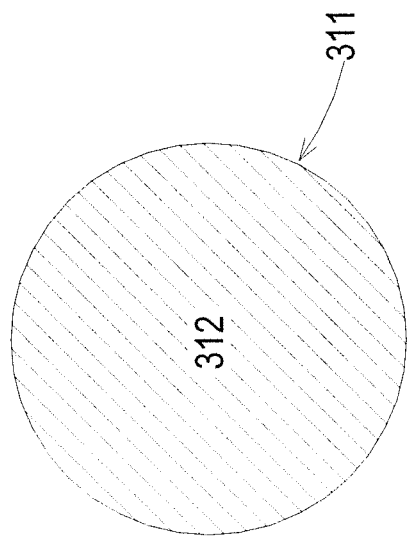
FIG. 3B schematically illustrates the configuration of a wavelength-transforming device as shown in FIG. 3A.

Please refer to FIGS. 3A, 3B and 3C. FIG. 3A schematically illustrates the configuration of an illumination system according to an embodiment of the present invention. FIG. 3B schematically illustrates the configuration of a wavelength-transforming device as shown in FIG. 3A. FIG. 3C schematically illustrates the configuration of a filter wheel as shown in FIG. 3A. The illumination system 3 of the present invention comprises a wavelength-transforming device 31, a solid-state light-emitting element 32 and a filter wheel 33 and is not limited to a transmissive illumination system. The wavelength-transforming device 31 is for example a phosphor wheel, a phosphor plate, a quantum dot wheel or a quantum dot plate, but not limited thereto. The wavelength-transforming device 31 comprises a segment 311 and a wavelength-transforming element 312. The wavelength-transforming element 312 is disposed on the segment 311 and is not limited to a phosphor agent or a quantum dot element. The filter wheel 33 is disposed on one side of the wavelength-transforming device 31, comprising a first filter 331, a second filter 332 and a third filter 333, and filtering lights through rotating. The first filter 331 is a red light filter, the second filter 332 is a green light filter, and the third filter 333 is a blue light filter or a blue-green light filter, but not limited thereto. A first color light L1 in a first waveband region is emitted to the wavelength-transforming device 31 by the solid-state light-emitting element 32 and excited as a second color light L2 in a second waveband region by the wavelength-transforming device 31. Taking the wavelength-transforming device 31 as a reference point, the incident direction of the first color light L1 in the first waveband region and the exit direction of the second color light L2 in the second waveband region are in the same direction. The second color light L2 is outputted with the rest of the first color light L1. In other words, a part of the first color light L1 emitted by the solid-state light-emitting element 32, which is not excited as the second color light L2 by the wavelength-transforming device 31, is emitted with the second color light L2. The first color light L1 and the second color light L2 are transmitted through the filter wheel 33. The filter wheel 33 filters the lights received, such that three primary color lights, i.e. red light R, green light G and blue light B are sequentially projected, which means that the three primary color lights are projected in a preset sequence.

In some embodiments, the illumination system 3 of the present invention further comprises a lens 34 disposed between the wavelength-transforming device 31 and the filter wheel 33. The lens 34 is a convex lens having positive power. An example of the lens 34 includes but is not limited to a magnifier or a biconvex lens. Via the lens 34, the second color light L2 transformed and emitted by the wavelength-transforming device 31 is transmitted through the lens 34 and focused on the filter wheel 33, such that the light transmitted through the filter wheel 33 is relatively convergent.

In this embodiment, the wavelength-transforming element 312 of the wavelength-transforming device 31 of the present invention is a green wavelength-transforming element, a green-yellow wavelength-transforming element or a yellow wavelength-transforming element, but not limited thereto. The first color light L1 in the first waveband region is excited as the second color light L2 in the second waveband region having a wavelength between 450 and 710 nanometers (nm). That is, the second color light L2 in the second waveband region is green light, green-yellow light or yellow light, and the spectrum of the second waveband region is between the wavelengths of green light and red light. Furthermore, the solid-state light-emitting element 32 of the present invention is a blue solid-state light-emitting element (e.g. a blue light laser element or a blue light-emitting diode). The wavelength of the blue light emitted by the solid-state light-emitting element 32 is between 380 and 500 nanometers. In brief, the present invention utilizes the first color light L1 emitted by the solid-state light-emitting element 32 and the second color light L2 excited by the wavelength-transforming device 31 are integrated to contain the three primary color lights by the lens 34. The integrated light may be regarded as equivalent white light, but not limited thereto. As a result, the illumination system 3 of the present invention emits red light without using a red phosphor agent in order to avoid the luminance and illuminance decay caused by the characteristic of the red phosphor agent when the driving current of the blue light laser rises.

In some embodiments, the driving current, the light-emitting energy and the laser intensity of the solid-state light-emitting element 32 and the concentration and thickness of the wavelength-transforming element 312 can be adjusted to change the ratio and the transformation efficiency of exciting the first color light L1 as the second color light L2. In other words, the intensity of the first color light L1, which is transmitted through the wavelength-transforming device 31 and emitted to the filter wheel 33, and the second color light L2, which is excited and outputted by the wavelength-transforming device 31, are adjustable according to the requirement or the design of the illumination system 3. Since the blue solid-state light-emitting element has a higher energy and a greater light-emitting efficiency, only a small amount of the rest of the first color light L1, which is emitted by the solid-state light-emitting element 32 but not excited by the wavelength-transforming device 31, is needed in order to be transmitted through the filter wheel 33 after the previous adjustment of the solid-state light-emitting element 32. Also, the amount of the first color light L1 in the first waveband region emitted by the adjusted solid-state light-emitting element 32 is enough to be provided as blue light for projection of the illumination system 3. That is to say, the purpose of the above-mentioned adjustment is to optimize the color performance of the second color light L2 excited by the wavelength-transforming device 31. In sum, the illumination system 3 of the present invention utilizes a single solid-state light-emitting element and a single wavelength-transforming device having a single segment in replace of conventional red phosphor agent or conventional red solid-state light-emitting element to simplify the fabricating processes, reduce the fabricating cost, be used in high working temperature, and further improve the color purity and image quality.

Additionally, the first filter 331, the second filter 332 and the third filter 333 in this embodiment are clockwise arranged on the filter wheel 33, but not limited thereto. In other embodiments, the first filter 331, the second filter 332 and the third filter 333 can be arranged according to the requirement of design. For example, if the preset sequence for projecting of the three primary color lights is sequentially arranged by the blue light B, the green light G and the red light R, the first filter 331 and the third filter 333 of the filter wheel 33 may exchange the position with each other in order to satisfy the requirement of the preset sequence. The three primary color lights are so sequentially projected in the preset sequence of the blue light B, the green light G and the red light R. Certainly, the arrangement of the first filter 331, the second filter 332 and the third filter 333 is various modified in other embodiments in reference of the teaching of the present invention. For instance, the first filter 331, the second filter 332 and the third filter 333 may be counter-clockwise arranged on the filter wheel 33.

Figure 4:
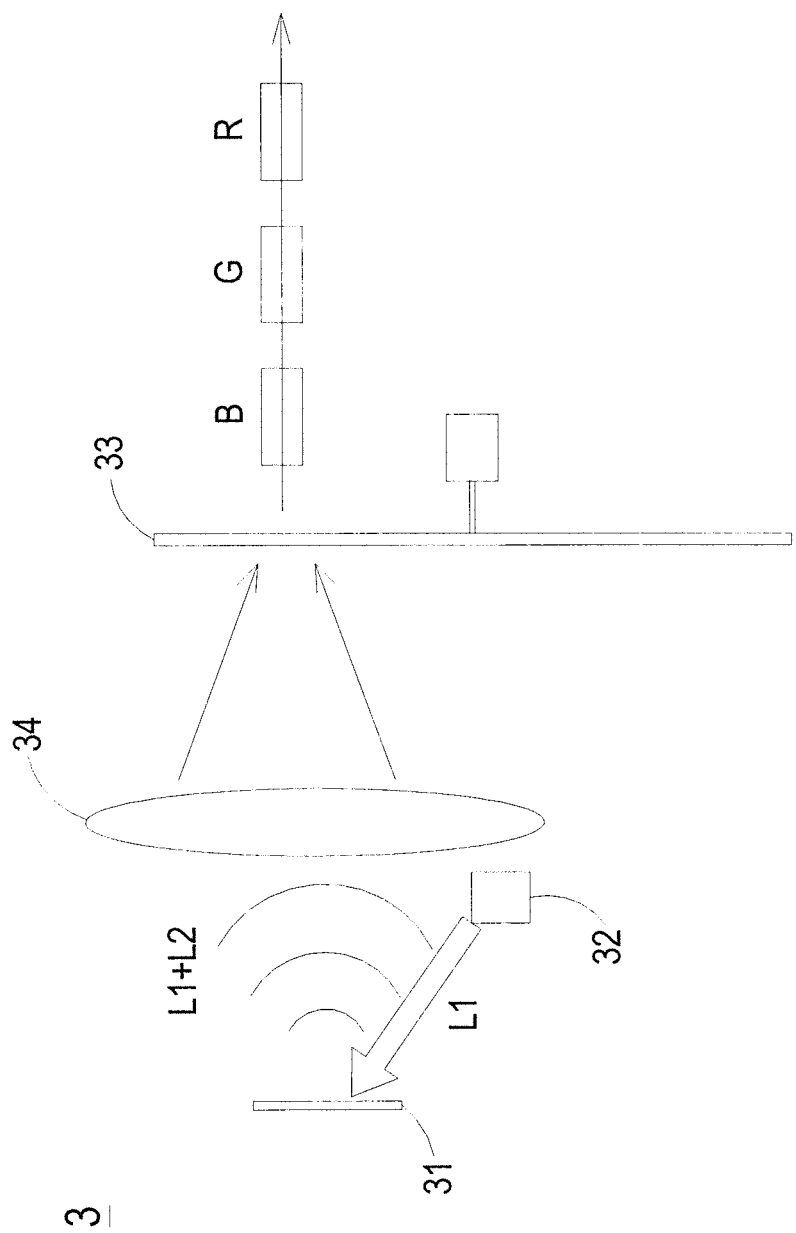
FIG. 4 schematically illustrates the configuration of an illumination system according to another embodiment of the present invention.

Please refer to FIGS. 3B, 3C and 4. FIG. 4 schematically illustrates the configuration of an illumination system according to another embodiment of the present invention. The illumination system 3 of the present invention comprises a wavelength-transforming device 31, a solid-state light-emitting element 32 and a filter wheel 33 and is not limited to a reflective illumination system. A first color light L1 in a first waveband region is emitted to the wavelength-transforming device 31 by the solid-state light-emitting element 32 and excited as a second color light L2 in a second waveband region by the wavelength-transforming device 31. Taking the wavelength-transforming device 31 as a reference point, the incident direction of the first color light L1 in the first waveband region and the exit direction of the second color light L2 in the second waveband region are in the opposite directions.

In this embodiment, except for the wavelength-transforming device 31 and the solid-state light-emitting element 32, the characteristics and the relations of the components of the illumination system 3 are similar to those of the illumination system of the embodiment mentioned above, and are not redundantly described herein. Likewise, the second color light L2 is outputted with the rest of the first color light L1. The first color light L1 and the second color light L2 are transmitted through the filter wheel 33. The filter wheel 33 filters the lights received, such that three primary color lights, i.e. red light R, green light G and blue light B are sequentially projected.

Generally, the first color light L1 in the first waveband region and the second color light L2 in the second waveband region are focused on a small area of the filter wheel 33 by the lens 34 in order to shrink the intermixing zone of the first color light L1 and the second color light L2 to promote the color purity and the image quality. Preferably, the first color light L1 in the first waveband region and the second color light L2 in the second waveband region are focused on a point of the filter wheel 33 by the lens 34, such that the first color light L1 and the second color light L2 are integrated as white light, which contains the three primary color lights. Under this circumstance, a variety of projections can be completed, and the performance of the image can be adjusted with the adjustment mentioned above for practical requirements.

Figure 5:
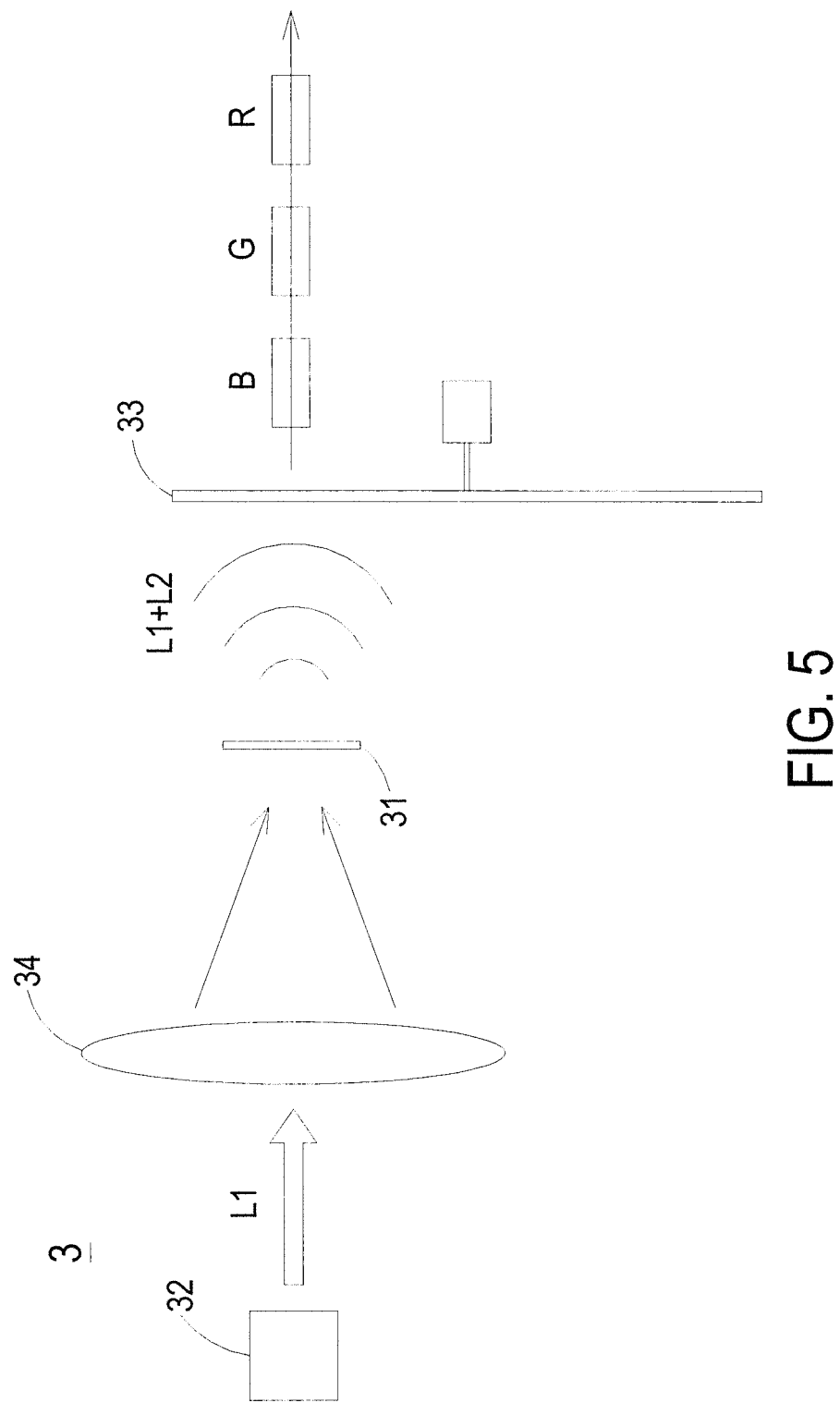
FIG. 5 schematically illustrates the configuration of an illumination system according to still another embodiment of the present invention.

Please refer to FIG. 5. FIG. 5 schematically illustrates the configuration of an illumination system according to still another embodiment of the present invention. The lens 34 can be disposed between the solid-state light-emitting element 32 and the wavelength-transforming device 31. The lens 34 is a convex lens having positive power. An example of the lens 34 includes but is not limited to a magnifier or a biconvex lens. In this embodiment, the first color light L1 emitted by the solid-state light-emitting element 32 is transmitted through the lens 34, and then focused on the wavelength-transforming device 31, such that the light transmitted through the wavelength-transforming device 31 is relatively convergent. The other characteristics and the relations of the components of the illumination system 3 are similar to those of the illumination system of the embodiment mentioned above, and are not redundantly described herein.

Moreover, a speckle phenomenon is a common issue of a conventional solid-state light-emitting element. A diffuser is added into the structure or configuration of the conventional illumination system to solve the issue of speckle phenomenon. While in the present invention, since the first color light L1 in the first waveband region is transmitted through the wavelength-transforming element 312 of the wavelength-transforming device 31, the issue of speckle phenomenon is automatically solved due to the characteristic of the wavelength-transforming element 312. In other words, the issue of speckle phenomenon is solved by the illumination system 3 of the present invention without utilizing a diffuser, so that the whole fabricating cost is reduced, the fabricating processes are simplified, and the volume of the product is also reduced.

Figure 6:
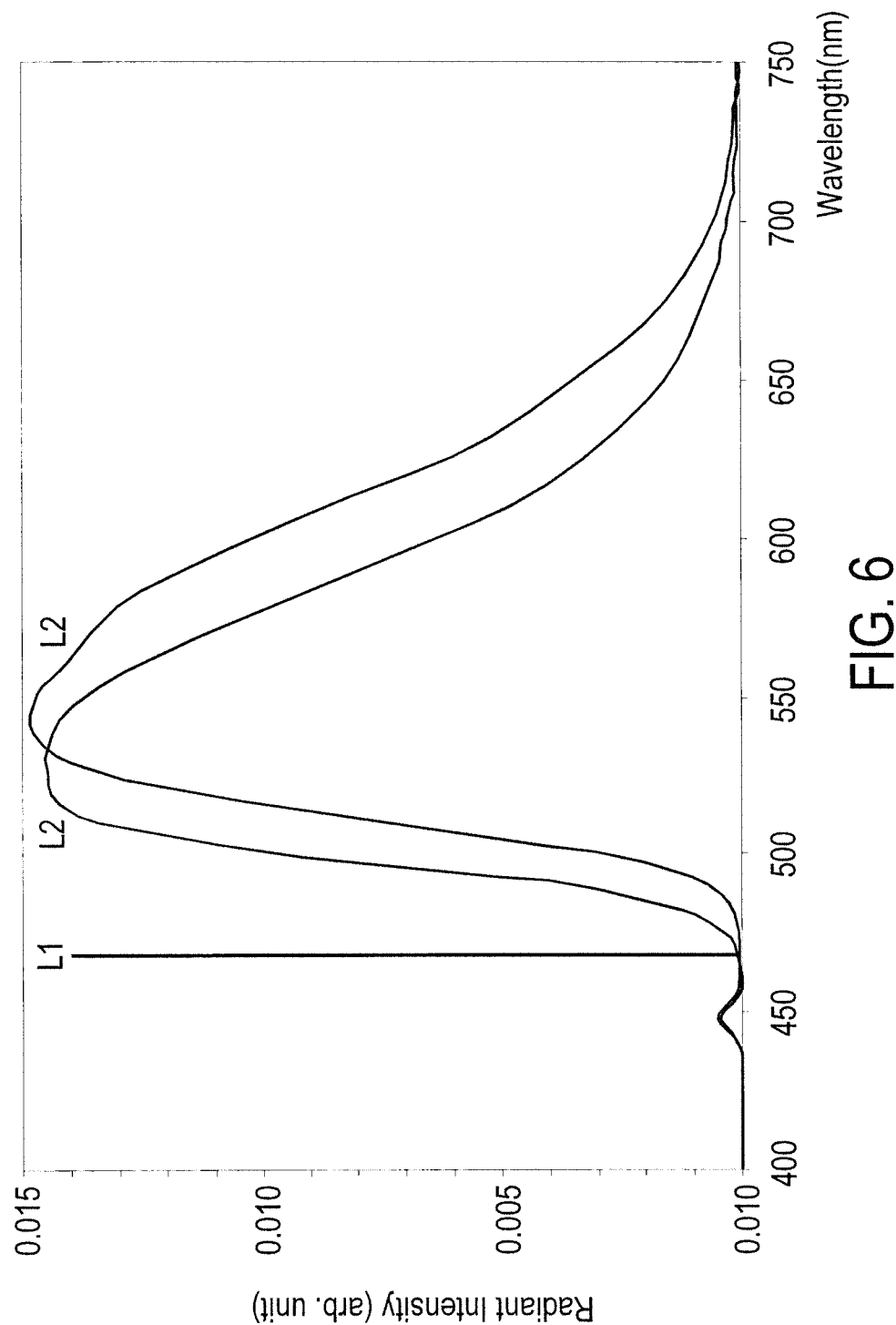
FIG. 6 schematically illustrates the spectrum of a first color light in a first waveband region and a second color light in a second waveband region according to an embodiment of the present invention.

FIG. 6 schematically illustrates the spectrum of a first color light in a first waveband region and a second color light in a second waveband region according to an embodiment of the present invention. As shown in FIG. 6, the wavelength of the first color light L1 in the first waveband region is between 380 and 500 nanometers, and is substantially between 460 and 475 nanometers in a preferable embodiment. The curve of the spectrum of the first color light L1 is more convergent due to the stable energy of the solid-state light-emitting element 32. The wavelength of the second color light L2 excited by the wavelength-transforming element 312 of the wavelength-transforming device 31 is between 450 and 710 nanometers, and the peak value of the spectrum of the second color light L2 is substantially between 500 and 600 nanometers in a preferable embodiment. In brief, the blue light of the first color light L1 in the first waveband region and the green light and the red light of the second color light L2 in the second waveband region are filtered by the filter wheel 33 and/or integrated by the lens 34, so that the three primary color lights are sequentially projected by the illumination system 3 of the present invention.

From the above description, the present invention provides an illumination system and a wavelength-transforming device thereof. The illumination system utilizes a single solid-state light-emitting element and a single wavelength-transforming device having a single segment in replace of conventional red phosphor agent or conventional red solid-state light-emitting element to simplify the fabricating processes, reduce the fabricating cost, be used in high working temperature, and further improve the color purity and image quality. On the other hand, via the wavelength-transforming device, a first color light in a first waveband region is excited and transformed as a second color light in a wider waveband region, which is the second waveband region. As a result, the illumination system emits red light without using a red phosphor agent, so that the luminance and illuminance decay caused by the characteristic of the red phosphor agent when the driving current of the blue light laser rises is avoided.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An illumination system, comprising:
   a wavelength-transforming device comprising a segment and a wavelength-transforming element, wherein said wavelength-transforming element is disposed on said segment;
   a solid-state light-emitting element, wherein a first color light in a first waveband region is emitted to said wavelength-transforming device by said solid-state light-emitting element; and
   a filter wheel disposed on one side of said wavelength-transforming device for filtering lights through rotating, wherein said first color light in said first waveband region is excited as a second color light in a second waveband region by said wavelength-transforming device, said second color light is outputted with the rest of said first color light, and said first color light and said second color light are transmitted through said filter wheel, such that three primary color lights are sequentially projected.

2. The illumination system according to claim 1 wherein said first color light in said first waveband region is blue light, and said second color light in said second waveband region is green-yellow light or yellow light.

3. The illumination system according to claim 1 wherein said wavelength-transforming device is a phosphor wheel, a phosphor plate, a quantum dot wheel or a quantum dot plate, and said wavelength-transforming element is a phosphor agent or a quantum dot element.

4. The illumination system according to claim 1 wherein said wavelength-transforming device is a transmissive wavelength-transforming device, and the incident direction of said first color light in said first waveband region and the exit direction of said second color light in said second waveband region are in the same direction.

5. The illumination system according to claim 1 wherein said wavelength-transforming device is a reflective wavelength-transforming device, and the incident direction of said first color light in said first waveband region and the exit direction of said second color light in said second waveband region are in the opposite directions.

6. The illumination system according to claim 1 further comprising a lens, wherein said lens is disposed between said wavelength-transforming device and the filter wheel, and wherein said first color light in said first waveband region and said second color light in said second waveband region are transmitted through said lens and focused on a point of said filter wheel so as to be integrated as white light.

7. The illumination system according to claim 6 wherein said lens has positive power.

8. The illumination system according to claim 1 further comprising a lens, wherein said lens is disposed between said solid-state light-emitting element and said wavelength-transforming device, and wherein said first color light in said first waveband region is transmitted through said lens and focused on said wavelength-transforming device.

9. The illumination system according to claim 8 wherein said lens has positive power.

10. The illumination system according to claim 1 wherein said filter wheel further comprises a first filter, a second filter and a third filter, and wherein said first filter is a red light filter, said second filter is a green light filter, and said third filter is a blue light filter or a blue-green light filter, wherein said red light filter, said green light filter and said blue light filter are clockwise arranged on said filter wheel.

11. The illumination system according to claim 1 wherein said solid-state light-emitting element is a blue light laser element or a blue light-emitting diode.

12. A wavelength-transforming device of an illumination system emitting a first color light in a first waveband region and comprising a filter wheel, comprising:
  a segment; and
  a wavelength-transforming element disposed on said segment,
  wherein said first color light in said first waveband region is received and excited as a second color light in a second waveband region by said wavelength-transforming element, said second color light is outputted with the rest of said first color light, and said first color light and said second color light are transmitted through said filter wheel, such that three primary color lights are sequentially projected.

* * * * *